United States Patent
Kung et al.

(10) Patent No.: US 8,323,484 B2
(45) Date of Patent: Dec. 4, 2012

(54) METHOD AND SYSTEM TO FLUSH AN RO SYSTEM

(75) Inventors: Chia Kung, Eden Prairie, MN (US);
Phillip Goebel, New Hope, MN (US);
Thomas J. Cartwright, Albertville, MN (US); Peter Cartwright, Bloomington, MN (US); Kenneth J. Sieth, Delafield, WI (US); Richard M. Reckin, Colgate, WI (US); Duane S. Freimuth, Milwaukee, WI (US)

(73) Assignee: General Electric Company, Fairfield, CT (US)

( * ) Notice: Subject to any disclaimer, the term of this patent is extended or adjusted under 35 U.S.C. 154(b) by 1053 days.

(21) Appl. No.: 12/038,879

(22) Filed: Feb. 28, 2008

(65) Prior Publication Data
US 2008/0149554 A1  Jun. 26, 2008

Related U.S. Application Data

(63) Continuation of application No. 10/802,663, filed on Mar. 17, 2004, now Pat. No. 7,402,240.

(51) Int. Cl.
*B01D 65/00* (2006.01)

(52) U.S. Cl. ........ 210/106; 210/109; 210/117; 210/134; 210/136; 210/257.2; 210/321.69

(58) Field of Classification Search .................. 210/106, 210/108–110, 117, 134, 136, 137, 195.2, 210/257.2, 321.69
See application file for complete search history.

(56) References Cited

U.S. PATENT DOCUMENTS

| | | | |
|---|---|---|---|
| 3,786,924 A * | 1/1974 | Huffman | 210/257.2 |
| 3,959,146 A | 5/1976 | Bray | |
| 4,629,568 A * | 12/1986 | Ellis, III | 210/636 |
| 4,650,586 A * | 3/1987 | Ellis, III | 210/636 |
| 4,705,625 A | 11/1987 | Hart, Jr. | |
| 4,784,771 A | 11/1988 | Wathen et al. | |
| 4,961,851 A | 10/1990 | Barbachano et al. | |
| 4,981,157 A | 1/1991 | Denkinger | |
| 5,122,265 A | 6/1992 | Mora et al. | |
| 5,132,015 A | 7/1992 | Down | |
| 5,512,167 A | 4/1996 | Gramms et al. | |
| 5,658,457 A | 8/1997 | Schoenmeyr | |
| 6,074,551 A | 6/2000 | Jones et al. | |

(Continued)

FOREIGN PATENT DOCUMENTS

WO  WO-02055182 A1  7/2002

(Continued)

OTHER PUBLICATIONS

"U.S. Appl. No. 10/802,663 Advisory Action mailed May 9, 2007", 3 pgs.

(Continued)

*Primary Examiner* — Joseph Drodge
(74) *Attorney, Agent, or Firm* — Schwegman Lundberg Woessner P.A.

(57) ABSTRACT

A home RO filtration system includes a membrane module having an inlet connected to a feed line, the membrane module also having a concentrate outlet coupled to a concentrate line, and a permeate outlet coupled to a permeate line. The permeate line communicates with a faucet. The system includes a flush reservoir communicatively coupled between the permeate line and the feed line. The system is configured such that after the faucet is turned off, a portion of permeate is delivered to the reservoir and then delivered to the inlet of the module to flush the module.

10 Claims, 6 Drawing Sheets

U.S. PATENT DOCUMENTS

| | | | | |
|---|---|---|---|---|
| 6,110,360 | A | * | 8/2000 | Hart, Jr. .................... 210/110 |
| 6,190,558 | B1 | | 2/2001 | Robbins |
| 7,402,240 | B2 | | 7/2008 | Kung et al. |
| 2005/0205478 | A1 | | 9/2005 | Kung et al. |

FOREIGN PATENT DOCUMENTS

| WO | WO-2004014528 | 2/2004 |
|---|---|---|

OTHER PUBLICATIONS

"U.S. Appl. No. 10/802,663 Final Office Action mailed Feb. 27, 2007", 9 pgs.

"U.S. Appl. No. 10/802,663 Non-Final Office Action mailed Jul. 17, 2006", 10 pgs.

"U.S. Appl. No. 10/802,663 Non-Final Office Action mailed Jul. 5, 2007", 9 pgs.

"U.S. Appl. No. 10/802,663 Response to Final Office Action filed Feb. 19, 2008", 6 pgs.

"U.S. Appl. No. 10/802,663 Response to Final Office Action filed Apr. 30, 2007", 11 pgs.

"U.S. Appl. No. 10/802,663 Response to Non-Final Office Action filed Jan. 17, 2007", 8 pgs.

"U.S. Appl. No. 10/802,663 Response to Non-Final Office Action filed Oct. 2, 2007", 13 pgs.

"U.S. Appl. No. 10/802,663 Supplemental Amendment filed Feb. 26, 2008", 5 pgs.

"U.S. Appl. No. 10/802,663 Final Office Action mailed Nov. 16, 2007", 10 pgs.

"European Search Report for Application No. EP 05 25 1590, Date mailed Jul. 12, 2005", 3 Pages.

"U.S. Appl. No. 10/802,663 Notice of Allowance mailed Mar. 11, 2008", NOAR, 9 pgs.

* cited by examiner

METHOD AND SYSTEM TO FLUSH AN RO SYSTEM

RELATED APPLICATIONS

This application is a Continuation of U.S. application Ser. No. 10/802,663, filed on Mar. 17, 2004, issued as U.S. Pat. No. 7,402,240, which is incorporated herein by reference in its entirety.

FIELD

The present invention relates to the field of water purifying systems and more specifically to a system to flush an RO system.

BACKGROUND

A reverse osmosis (RO) system includes a membrane. When feed water enters the system, some water goes through the membrane as purified permeate and some is left as concentrate. When the system is shut off, there is no flow through the system and the salts and impurities can slowly diffuse through the membrane from the concentrate side into the permeate side. When the system is turned on again, this results in the delivery of permeate having a higher concentration of impurities being delivered to the faucet than when the system was turned off.

SUMMARY

A system includes a membrane module having an inlet connected to a feed line, the membrane module also having a concentrate outlet coupled to a concentrate line, and a permeate outlet coupled to a permeate line. The permeate line communicates with a faucet. The system also includes a flush reservoir communicatively coupled between the permeate line and the feed line. The system is configured such that after the faucet is turned off, a portion of permeate is delivered to the reservoir and then delivered to the inlet of the module to flush the module.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 1:
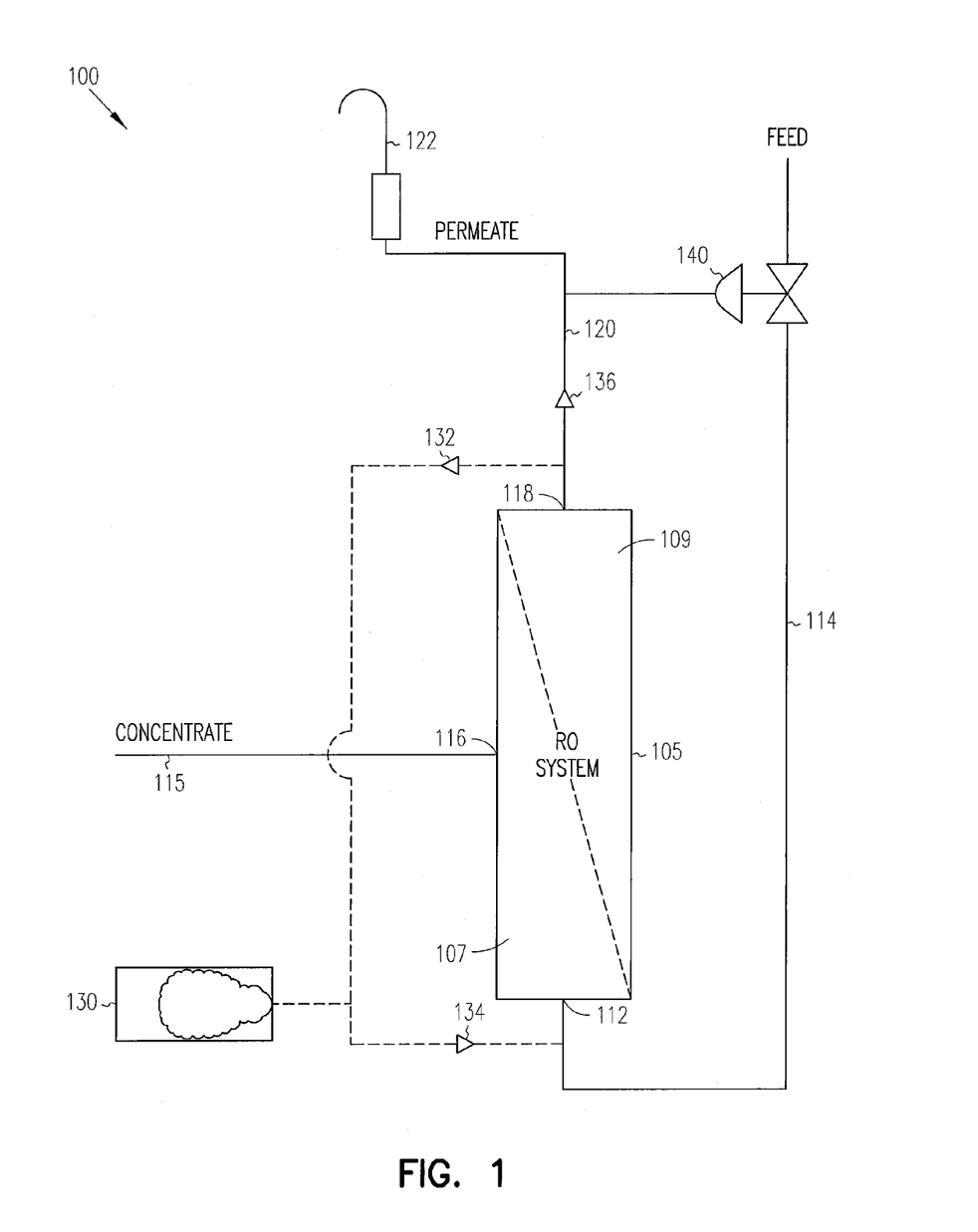
FIG. 1 shows a schematic representation of a RO system in accordance with one embodiment.

FIG. 1 shows a schematic representation of an RO system 100 in accordance with one embodiment. System 100 includes an RO membrane module 105 having a concentrate portion 107 and a permeate portion 109. Module 105 has a feed water input 112 communicating with a feed water input line 114. System 100 also includes a concentrate outlet 116 communicating with a concentrate outlet line 115, and a permeate outlet 118 communicating with a permeate outlet line 120. Permeate outlet line 120 is coupled to a faucet 122, which can be actuated to allow water to flow through the system. Lines 114, 115, and 120 can be hoses, molded passages, pipes, other fluid communication passages, or combinations of any of these. In general use, feed water flows into input 112, and concentrate flows out of outlet 116 while permeate is delivered out of output 118.

A flush reservoir 130 is coupled between permeate outlet line 120 and feed water inlet line 114. In one embodiment, a check valve 132 is located between permeate outlet line 120 and reservoir 130 and a check valve 134 is located between inlet line 114 and the reservoir. As will be discussed in further detail below, reservoir 130 temporarily stores an amount of permeate after faucet 122 has been turned off by a user. The stored permeate from the flush reservoir 130 is then fed back into module 105 via input 112 to flush the concentrate portion 107 of the module. In some embodiments, flush reservoir 130 can be a diaphragm tank or a type of accumulator, for example. In one embodiment, flush reservoir 130 can be dimensioned to hold up to about one liter of permeate. Other embodiments can utilize reservoirs of greater size or less size.

RO module 105 can include one, two, or more RO elements which can be configured in series or in parallel. For example, spiral wound elements having a diameter of about 2 inches or less and a length of about 12 inches or less can be used. In one embodiment, RO module 105 can also include a pre-filter, such as a carbon filter, to treat the feed water before the water reaches the RO elements. In one embodiment, system 100 can include a housing enclosing and housing the elements. In some embodiments, the housing can enclose flush reservoir 130 also. For example, the housing can enclose all the relevant parts of system 100 except for faucet 122. In other embodiments, flush reservoir 130 can be separate from the housing. The housing can include three inlet/outlets, such as inlet/outlets 112, 116, 118 to communicate with the outside.

In some embodiments, a high-flux membrane can be used for the RO elements of module 105. A module having a high-flux membrane eliminates the need for a permeate storage tank between the permeate outlet 118 and the faucet 122. Such a tank-less system emphasizes the need for flushing module 105 after use since the permeate comes directly from module 105 without being dissipated in a storage tank and re-filtered before being delivered to a user, such as in typical RO home systems.

A flow control 140, such as an automatic shut-off valve, is operatively coupled between outlet line 120 and feed water line 114. A check valve 136 is located in line 120 between flow control 140 and permeate outlet 118, and after the branching of the line to flush reservoir 130. Flow control 140 is operative so as to use the pressure differential between permeate line 120 and feed line 114 to regulate flow through the system. In one embodiment, a non-electric automatic shut-off valve can be used. Thus, when a user opens faucet 122 the corresponding drop in pressure in line 120 causes flow control 140 to open feed line 114 letting water flow into inlet 112 (check valve 134 prevents feed water from flowing towards reservoir 130). When the faucet 122 is closed, the eventual rise of pressure in line 120 as reservoir 130 fills causes flow control 140 to close line 114.

In general, system 100 is configured as a tank-less RO system for home use. In such an environment, feed-line 114 operates under a feed pressure of about 40-75 psi. The entire system is usually fitted beneath a sink or can be enclosed in a housing and located on a counter next to the sink, for example.

FIGS. 2-6 show the operation of system 100, in accordance with one embodiment. As noted above, system 100 is configured such that when the system is turned off, a portion of permeate is delivered from the outlet to the inlet to flush the system.

Figure 2:
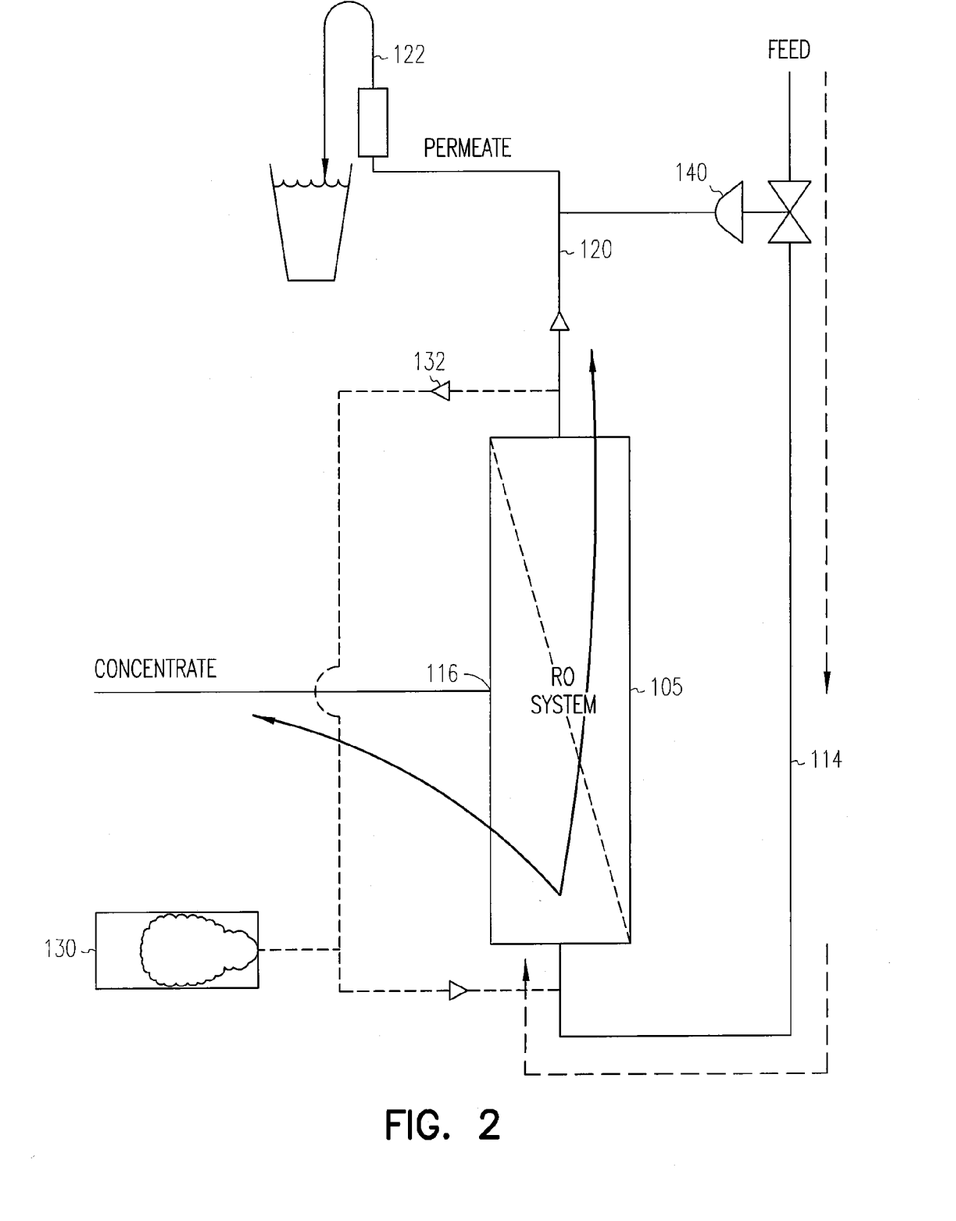
FIGS. 2-5 show an example of the system of FIG. 1 in operation.
Figure 3:
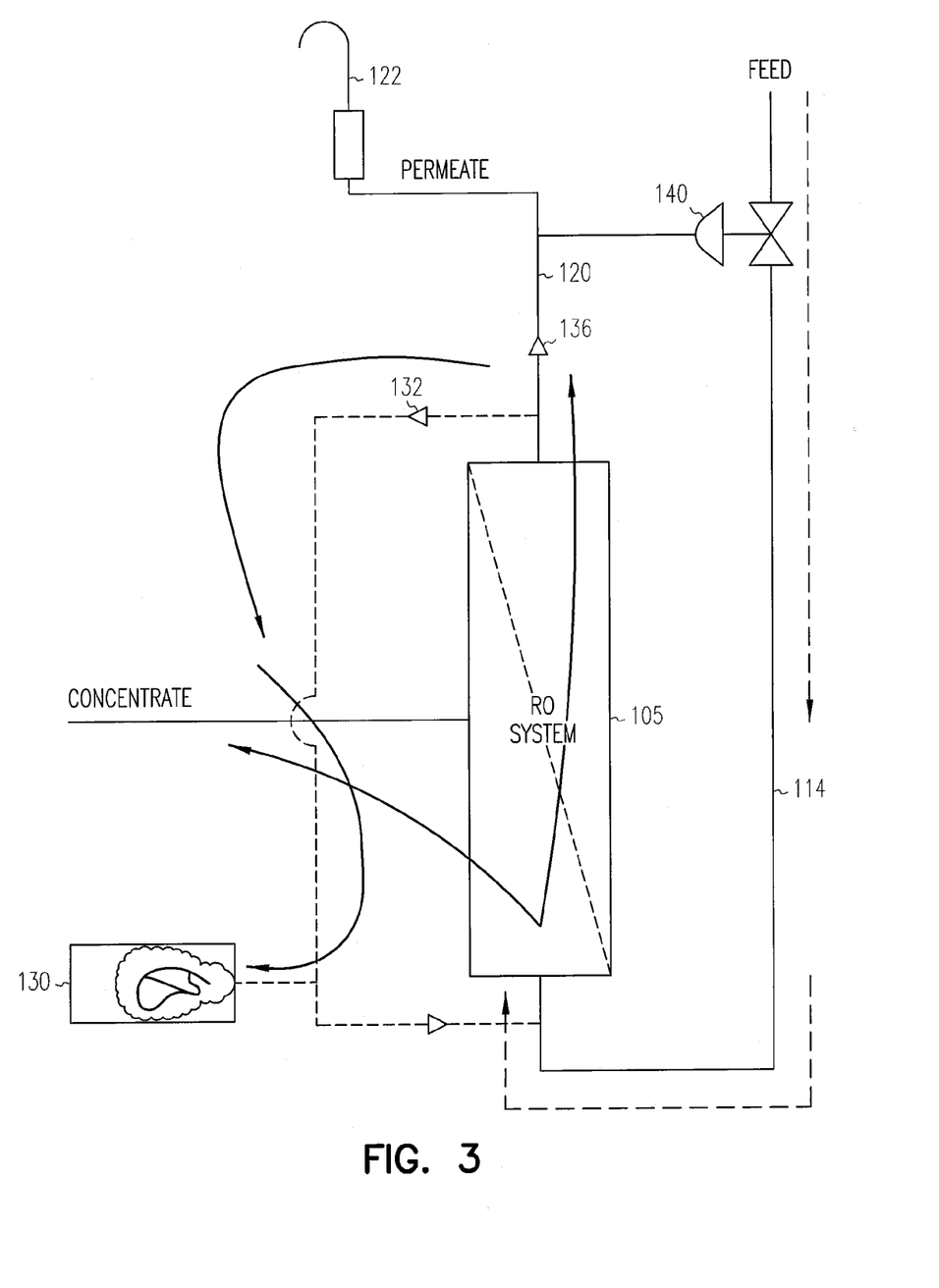

FIG. 2 shows the operation of the system when faucet 122 is opened. When the faucet is opened, the corresponding drop in pressure in line 120 causes control 140 to open feed water line 114. The feed water enters module 105 and concentrate flows out of concentrate outlet 116 while permeate is delivered to the user via faucet 122. In one example, flush reservoir 130 has a positive pressure when dry or empty of about 3 psi. Check valve 132 prevents permeate from flowing to reservoir 130 until that pressure is overcome. Thus, when the faucet is open, line 120 is at about atmospheric pressure and virtually all the permeate flows out of the faucet.

When faucet 122 is closed (FIG. 3), pressure increases in line 120 and permeate flow branches towards reservoir 130 through check valve 132. As the reservoir 130 is filled with permeate, pressure builds in line 120 until the pressure differential across control 140 causes control 140 to shut off feed line 114. In one embodiment, control 140 closes the feed line when line 120 is at about ⅓ to ¼ of the feed line pressure. Check valve 136 then acts to maintain the pressure built up in line 120 so as to keep the feed line shut off as long as faucet 122 remains closed. In one example, flow of feed water continues for about 30 seconds after the faucet is turned off. As noted above, in one example the reservoir 130 is filled with approximately 1 liter of permeate during this time.

Figure 4:
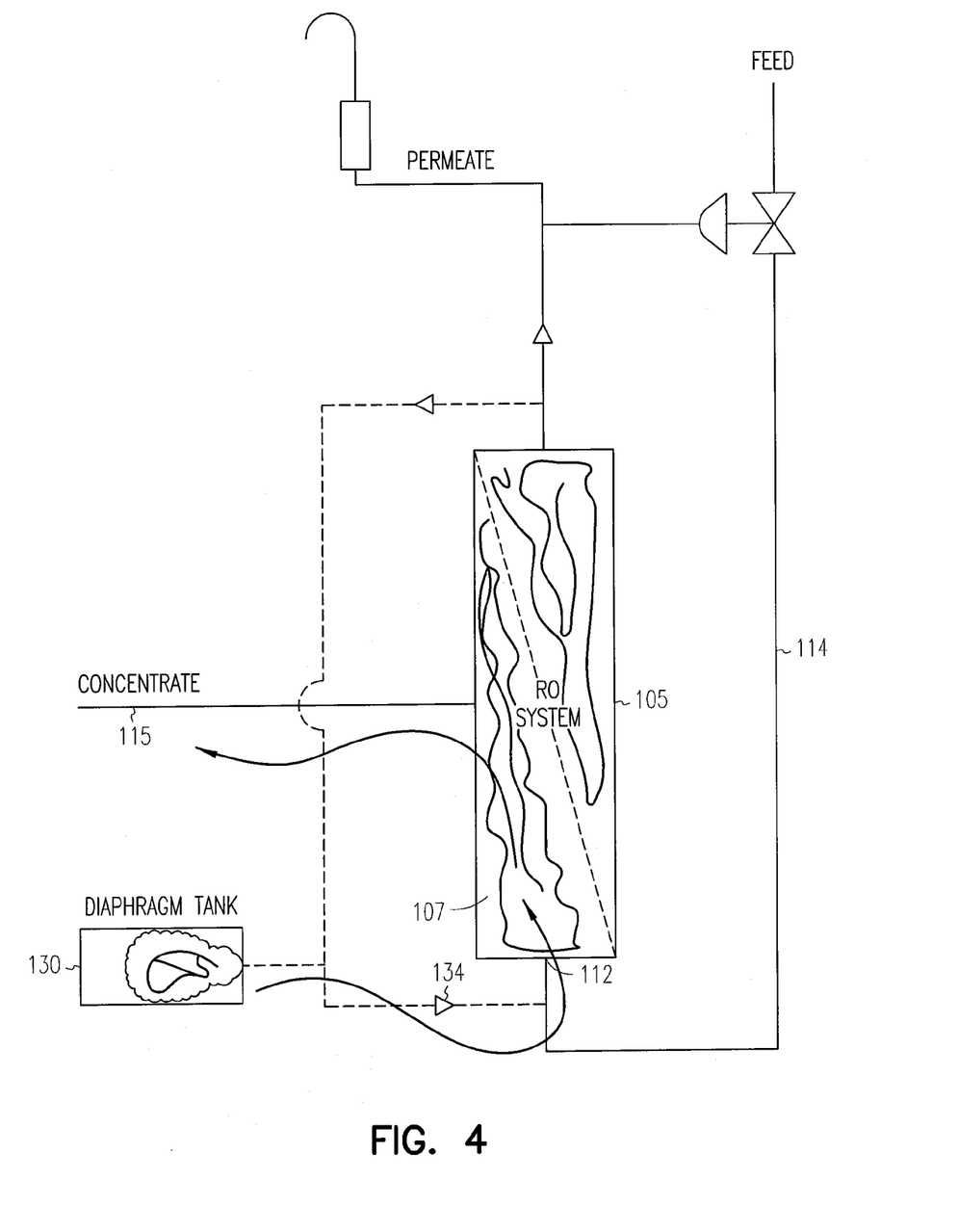

Referring to FIG. 4, once the feed line is 114 is closed and reservoir 130 is sufficiently filled with permeate, the pressure differential between reservoir 130 and feed line 114 causes the stored permeate to flow through check valve 134 and into inlet 112 of module 105. The permeate from reservoir 130 dilutes the higher concentration portion 107 of module 105 and eventually flushes the concentrate out to the concentrate line 115 such that the concentrate portion 107 of the module is filled at least partially with permeate or filled completely with permeate. In one example, flush reservoir builds up to about a 10 psi pressure when being filled with permeate.

Figure 5:
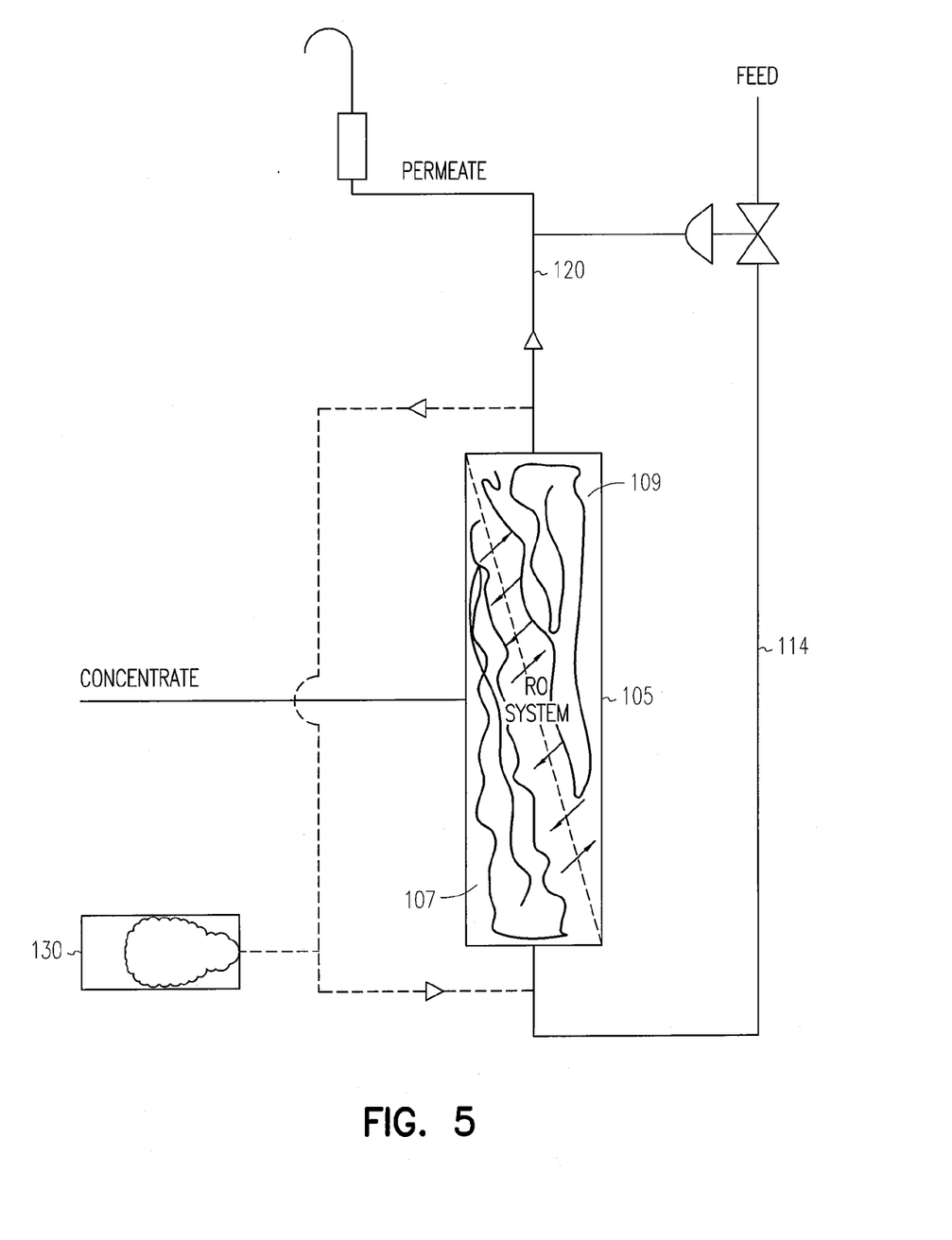

As can be seen in FIG. 5, once permeate is within concentrate portion 107, any cross-diffusion within the module only results in permeate entering the permeate portion 109 of the module. Accordingly, when the faucet 122 is opened again, the permeate that flows immediately out of the faucet does not contain unacceptable amounts of salt or other impurities.

In one example, system 100 can be installed in a typical home RO environment. For example, feed pressure in line 114 can be about 40-75 psi. Control 140 can be an automatic shut-off valve designed to shut off line 114 when the pressure differential across the shut-off valve is about ⅓ to ¼ of the feed line pressure. Check valve 136 can be a one-way check valve. Check valve 132 can be a one-way check valve that opens when the faucet closes due to pressure build up in the outlet line. Check valve 134 can be a one-way check valve that opens once the reservoir pressure is greater than the feed line pressure. In one or more embodiments, one or more of valves 132, 134, 136 can be omitted and/or other flow controls used. In one embodiment, a flow control, such as an automatic shut-off valve can be operatively coupled between line 120 and concentrate outlet line 115 in place of, or in addition to, control 140 discussed above.

Accordingly, system 100 provides a relatively simple flushing system which does not require pumps or electronic controls to force or control the flow of water through the system. In contrast, by using check valves 132, 134, 136, and automatic shut-off valve 140, the system allows for automatic flushing of the concentrate side of module 105 each time the faucet is closed. By waiting until the faucet closes to collect the permeate for flushing, the system does not waste any permeate or inconvenience the user. The flushing happens without the user even being aware of it and no permeate that the user wants immediately is diverted.

Figure 6:
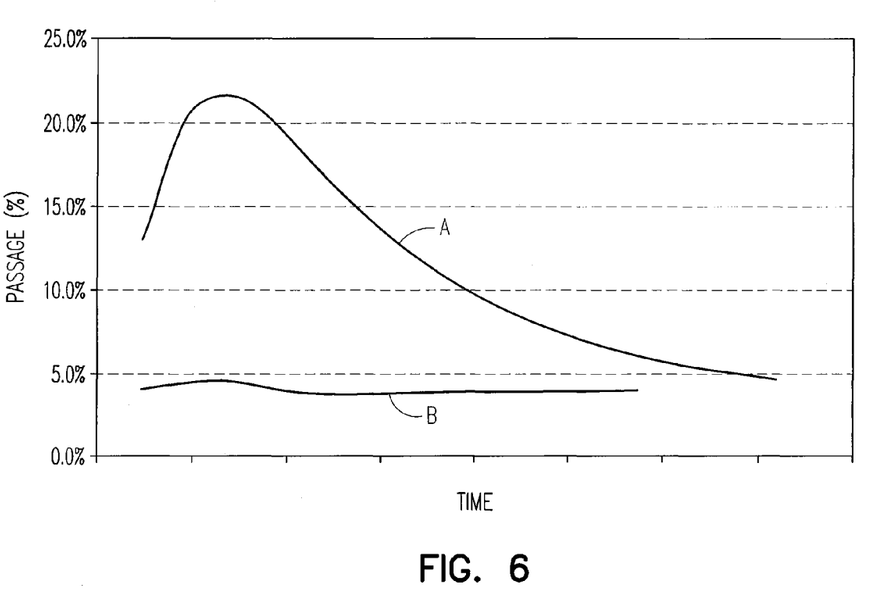
FIG. 6 is a graph depicting the performance of one embodiment of the present system.

FIG. 6 shows a graph of test results comparing salt passage percentage over time when a faucet is opened after a 10-minute gap between closing the faucet and opening it again. Line A shows a standard system without flushing where it is shown that a high percentage of impurities are delivered when the system is first opened. Line B shows a system as described above, according to one embodiment, where the impurity percentage starts off and stays relatively low when the faucet is opened.

In some embodiments, system 100 can also be used with a permeate storage tank located between module 105 and faucet 122 to store permeate.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A system comprising:
   a membrane module that includes an inlet, a concentrate outlet and a permeate outlet;
   a feed line coupled to the inlet;
   a concentrate line coupled to the concentrate outlet;
   a permeate line coupled to the permeate outlet, the permeate line communicating with a faucet;
   a flush reservoir between the permeate line and the feed line;
   a first check valve between the permeate line and the flush reservoir such that the first check valve allows permeate to be delivered to the flush reservoir to fill the flush reservoir when the faucet is closed and the feed line is open; and
   a second check valve between the flush reservoir and the feed line such that the second check valve allows permeate to be delivered from the reservoir to the inlet of the membrane module to flush the membrane module when the faucet is closed and the feed line is closed.

2. The system of claim 1, further comprising a third check valve between the permeate outlet and the faucet such that the third check valve allows permeate to be delivered from the outlet of the membrane module to the faucet when the faucet is open and the feed line is open.

3. The system of claim 2 further wherein the first, second and third check valves are each one-way check valves.

4. The system of claim 1 further comprising a control coupled between the permeate line and the feed line such that the control opens the feed line when the faucet is open and closes the feed line when the flush reservoir is full.

5. The system of claim 4, wherein the control includes a non-electric automatic shut-off valve.

6. A system comprising:
   a membrane module that includes an inlet, a concentrate outlet and a permeate outlet;
   a feed line coupled to the inlet;
   a concentrate line coupled to the concentrate outlet;

a permeate line coupled to the permeate outlet, the permeate line communicating with a faucet;

a flush reservoir between the permeate line and the feed line such that permeate from the membrane module does not enter the flush reservoir while the faucet is turned on and enters the flush reservoir while the faucet is turned off; and a control coupled between the permeate line and the feed line such that the control opens the feed line when the faucet is open and closes the feed line when the flush reservoir is full of permeate.

7. The system of claim 6, wherein the control includes a non-electric automatic shut-off valve.

8. The system of claim 6, further comprising:

a first check valve between the permeate outlet and the flush reservoir such that the first check valve allows permeate to be delivered from the permeate outlet to the flush reservoir to fill the flush reservoir when the faucet is closed and the feed line is open; and a second check valve between the flush reservoir and the feed line such that the second check valve allows permeate to be delivered from the flush reservoir to the inlet of the membrane module to flush the membrane module when the faucet is closed and the feed line is closed by the control.

9. The system of claim 8, further comprising a third check valve between the permeate outlet and the faucet such that the third check valve allows permeate to be delivered from the outlet of the membrane module to the faucet when the faucet is open and the feed line is open.

10. The system of claim 9 wherein the first, second and third check valves are each one-way check valves.

\* \* \* \* \*